No. 728,930. PATENTED MAY 26, 1903.
H. L. JOHNSON.
PLANTER AND MARKER.
APPLICATION FILED FEB. 19, 1902.
NO MODEL. 4 SHEETS—SHEET 3.
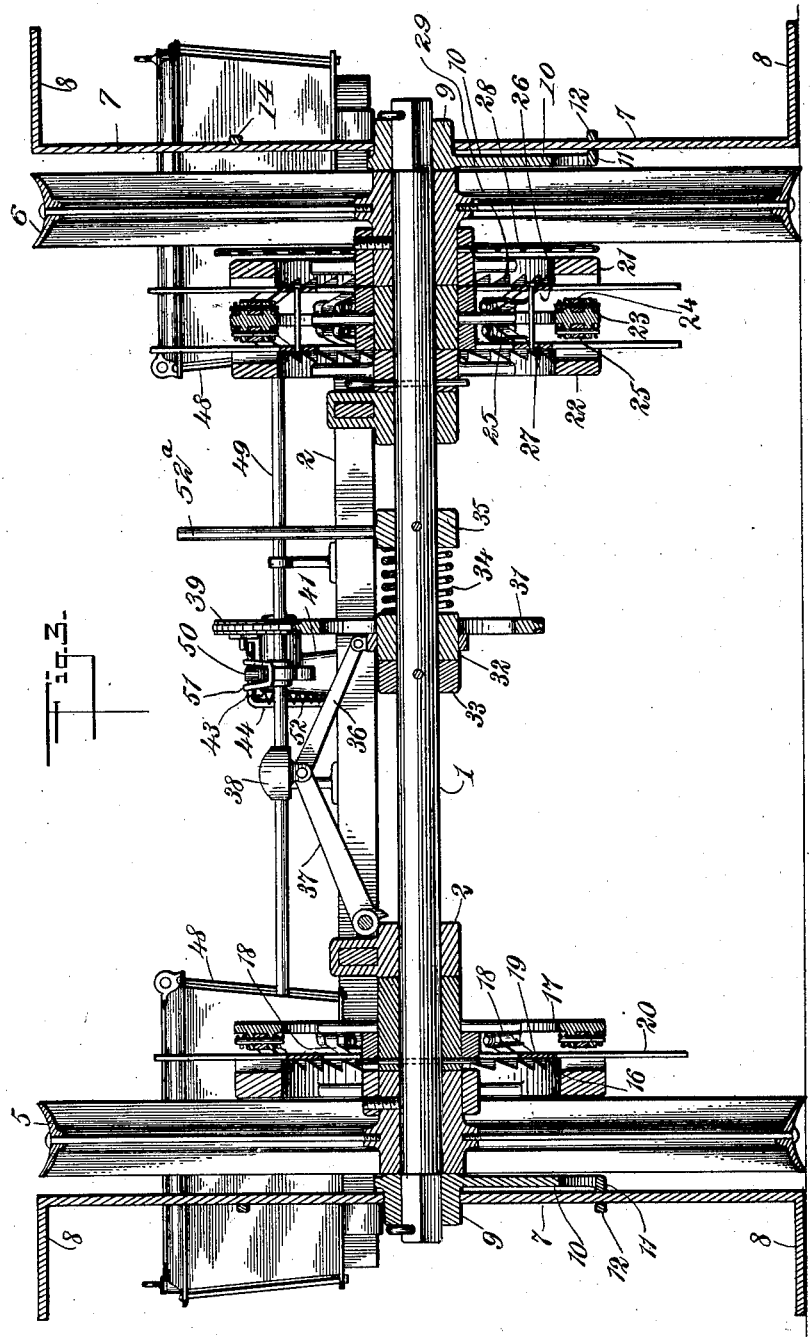
WITNESSES:
H. Russell Bond
C. R. Ferguson
INVENTOR
Harry L. Johnson
BY
ATTORNEYS

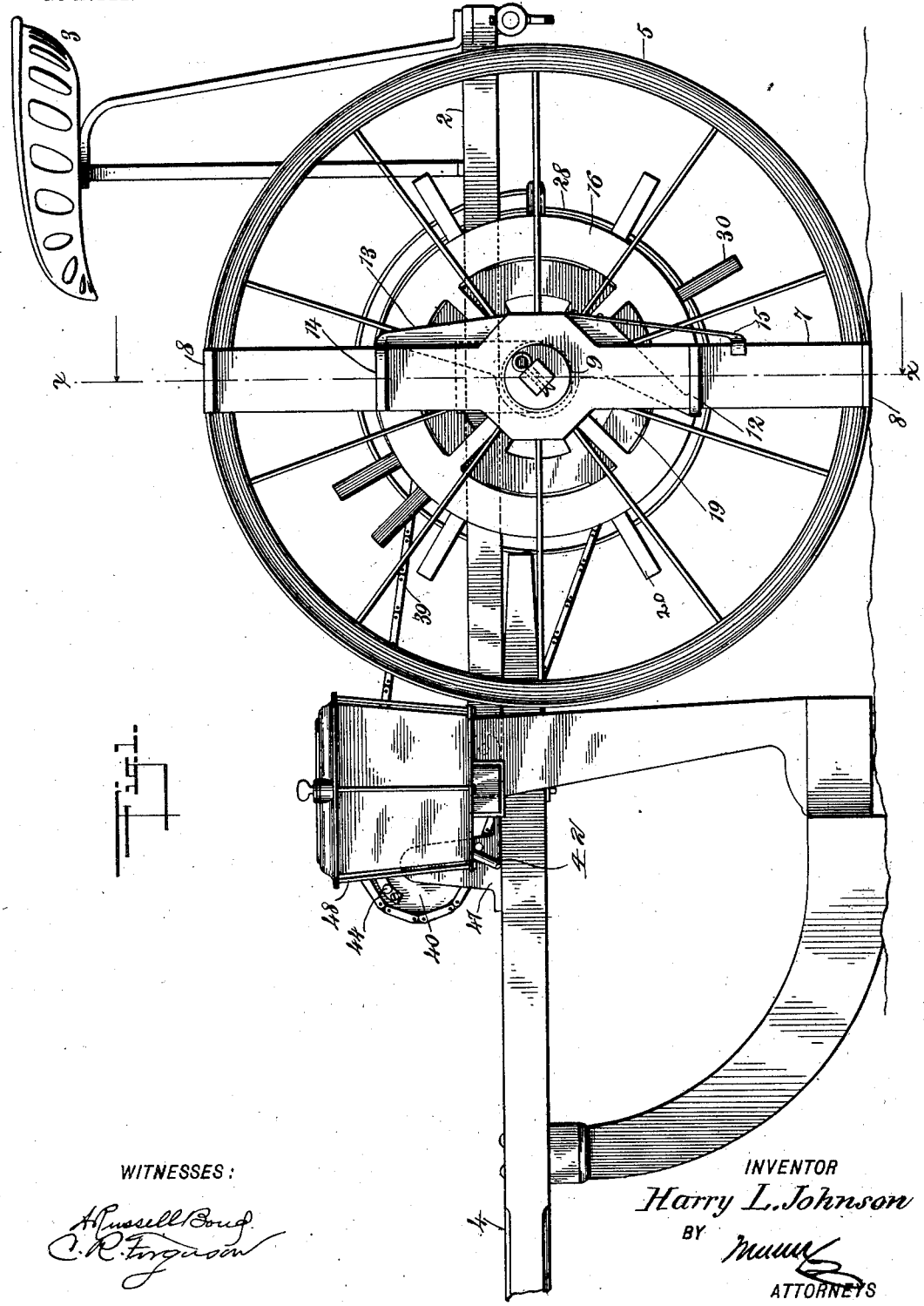

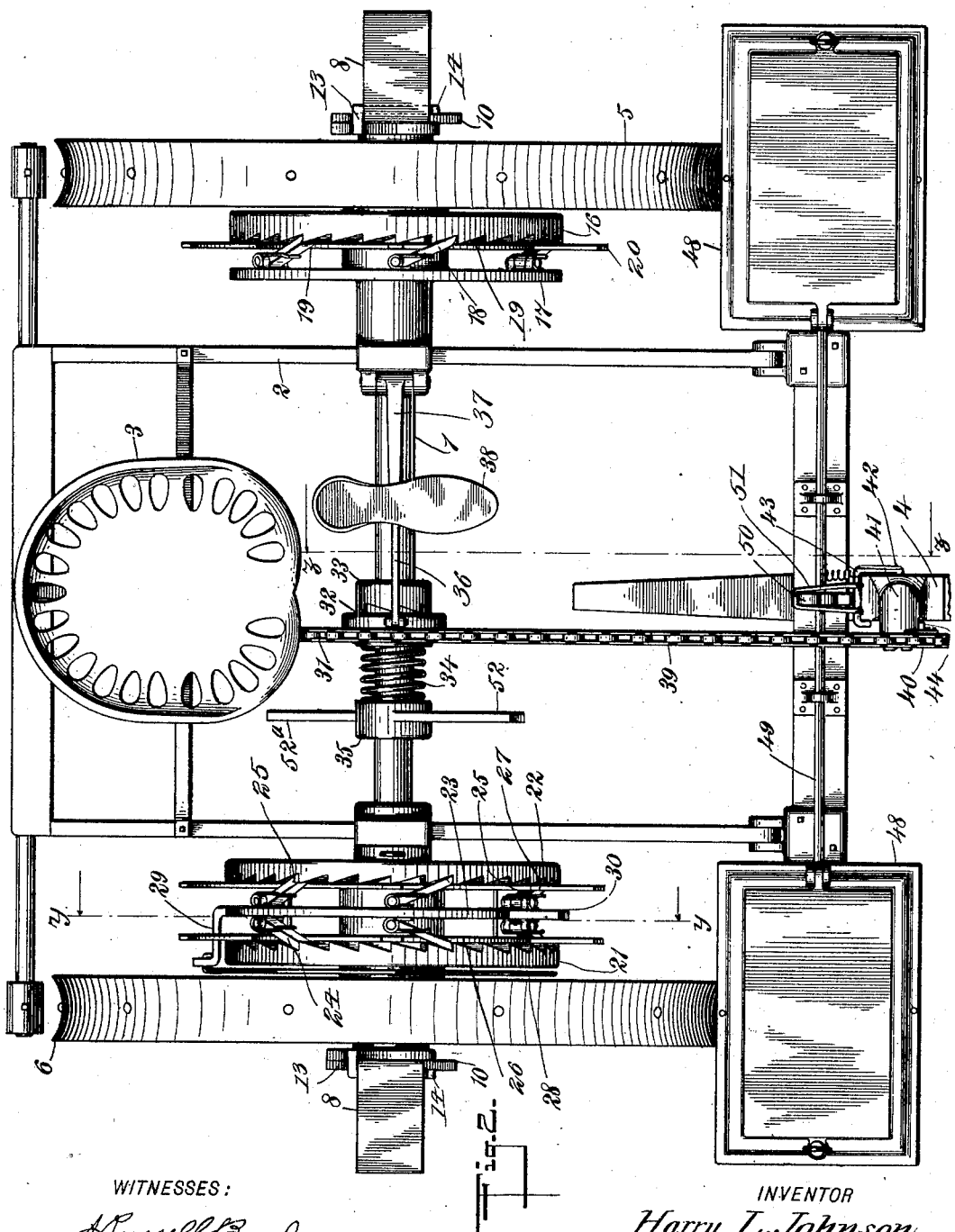

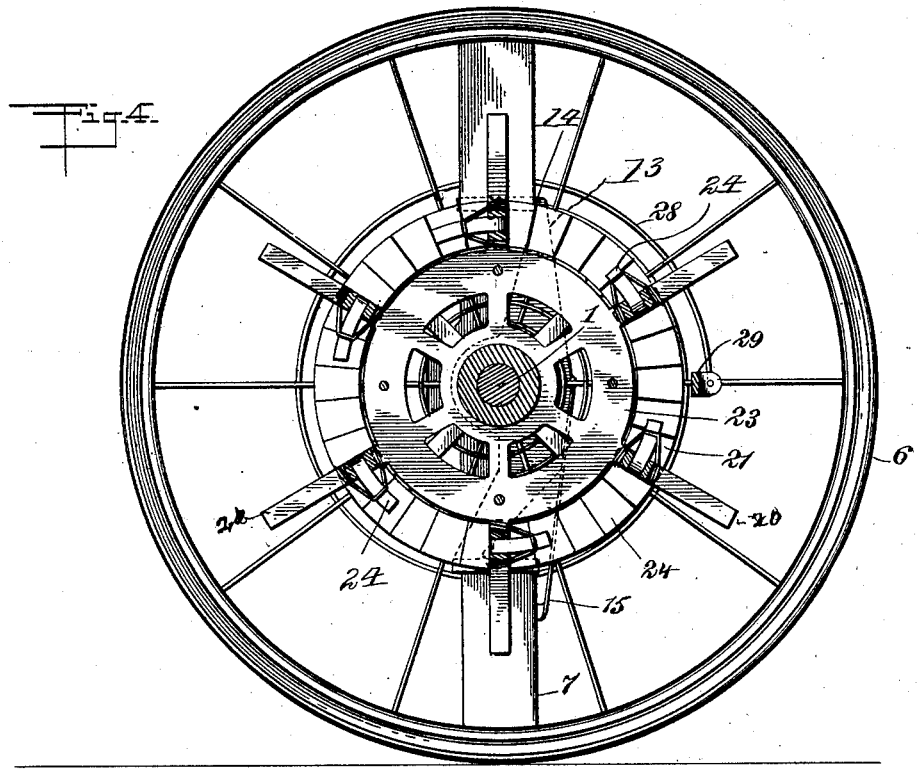

No. 728,930.

Patented May 26, 1903.

UNITED STATES PATENT OFFICE.

HARRY LEE JOHNSON, OF GOLDEN CITY, MISSOURI.

PLANTER AND MARKER.

SPECIFICATION forming part of Letters Patent No. 728,930, dated May 26, 1903.

Application filed February 19, 1902. Serial No. 94,744. (No model.)

*To all whom it may concern:*

Be it known that I, HARRY LEE JOHNSON, a citizen of the United States, and a resident of Golden City, in the county of Barton and State of Missouri, have invented a new and Improved Planter and Marker, of which the following is a full, clear, and exact description.

This invention relates to improvements in seed-planters and line-markers; and the object is to provide a machine of this character in which the several parts may be readily adjusted to cause the dropping of seed at proper intervals and to overcome the unevenness of the ground, so as to require the least possible adjustment in regulating, the parts being so arranged that the planting is regulated or governed from the ground-wheel having the slower movement due to unevenness of ground, and consequently causing the axle from which the dropping mechanism is directly operated to rotate in unison with the said slower wheel. Other objects will appear in the general description.

I will describe a planter and marker embodying my invention and then point out the novel features in the appended claims.

Reference is to be had to the accompanying drawings, forming a part of this specification, in which similar characters of reference indicate corresponding parts in all the figures.

Figure 1 is a side elevation of a planter and liner or marker embodying my invention. Fig. 2 is a plan view thereof. Fig. 3 is a transverse section on the line $x$ $x$ of Fig. 1. Fig. 4 is a longitudinal section on the line $y$ $y$ of Fig. 2. Fig. 5 is a longitudinal section on the line $z$ $z$ of Fig. 2, and Figs. 6 and 7 are details showing means for making slight regulations in the dropping mechanism.

Referring to the drawings, 1 designates an axle having bearings in or rather supporting the main frame 2, on the rear portion of which is a driver's seat 3, and extended from the front is the pole or tongue 4. Loosely mounted on the axle 1 are the ground-wheels 5 and 6, and on the outer side of each ground-wheel and adapted to rotate with the axle is a marker consisting of a plate 7, extended in opposite directions from the axle and having a length substantially equal to the diameter of the wheel, and the ends are turned outward, as indicated at 8. The marker is loosely mounted on a collar 9, removably connected to the axle, but designed to rotate therewith. I have shown the axle as provided with angular ends to engage in correspondingly-shaped openings in the collars 9. From each collar 9 an arm 10 extends downward and has guide-fingers 11 12, engaging, respectively, against the inner and outer sides of the plate 7, and extended upward from the collar is an arm 13, having a guide-finger 14, engaging against the outer side of the plate. It will be noted that the fingers 11 and 12 extend in an opposite direction from the finger 14. A plate-spring 15 is attached to the collar 9 and engages with the rear side of the plate 7. This spring 15 normally presses the plate into engagement with the arm 10 or a part thereof, and it is designed to permit the marker to move faster than the wheel when the marker meets an obstruction—such as a high ridge, rock, or stump—thus permitting the marker to pass over without wrenching the apparatus.

Rigidly attached to the inner side of the ground-wheel 5 is a crown ratchet wheel or ring 16, and rigidly attached to the axle 1 is a wheel 17, carrying spring-pressed pawls 18, designed for engagement with teeth of the ratchet-wheel in the direction in which the wheels turn. Mounted loosely on the hub of the wheel 17 is a spider-like wheel 19, designed, when desired, to force the pawls out of engagement with the ratchet-wheel, and to permit of convenient movement of said wheel 19 it is provided with radial arms 20, with one of which the driver may engage his foot to rotate the wheel in a direction to release the pawls by the arms of the wheel coming in engagement with the pawls.

Rigidly connected to the hub of the ground-wheel 6 is a crown ratchet-wheel 21, similar to the ratchet-wheel 16, and rigidly attached to the axle inward of the ratchet-wheel 21 is a ratchet-wheel 22, the teeth of which are on the side. Arranged loosely on the axle, between the wheels 21 and 22, is a pawl-carrying wheel 23. This wheel 23 has spring-pressed pawls 24 at one side for engaging with the ratchet-wheel 21 and spring-pressed pawls 25 at the opposite side for engaging with the ratchet-wheel 22 in the direction in which the wheels turn. Also arranged between the wheels 21 and 22 and loosely mounted on the axle at opposite sides of the wheel 23 are pawl-shifting spiders or wheels 26 27, connected one with the other by bolts, as clearly shown in Fig. 3. These spiders or wheels have outwardly-extended arms, against which the driver may place his foot when it is desired to shift the pawls out of engagement with the ratchet-wheels.

Between the ratchet-wheel 21 and the ground-wheel 6 is a spring 28. This spring is made in the form of a coil, having one end connected to the hub or to some other part of the wheel 6 and the other end connected to an arm 29, extended from the wheel 23. This spring 28 is designed to transmit motion from the ground-wheel 6 to the loosely-mounted wheel 23 and thence to the axle through the medium of the pawls 25 and ratchet-wheel 22. Extended outward from the wheel 23 is an arm 30 to enable a person to hold the wheel 23 to prevent the pawls from running around on the ratchet-wheel. By this arrangement of combined pawl-and-ratchet connections between the ground-wheels and axle it is to be seen that the slower turning ground-wheel regulates or governs the drop. The pawls 24 and their ratchet-wheel 21 prevent the spring from turning the axle faster than the wheel 6 turns. Likewise the pawls 18 and ratchet-wheel 16 prevent the spring from turning the axle faster than the wheel 5 turns. The wheels 5 and 6 are each permitted to turn on the axle when one is turning faster than the other, the former by the yielding of the pawls 18 and the latter by the yielding of the pawls 24 and the spring 28.

The pawls are designed not only to be moved out of engagement with the ratchet-wheels when the machine is moved from field to field or the like, but they are designed to be disengaged by means of the spiders upon reaching the end of a field and turning. At the ends of a field the adjustment is easily secured by the pawls all being thrown out of engagement, and thus permitting the free rotation of the axle in either direction to the desired place. The adjustment that may be necessary while the machine is in progress is secured rearwardly easily by the yielding of the pawls 18 and 24 and the coil-spring 28. It is secured forwardly by disengaging the pawls 18 and by the yielding of the pawls 25. In both cases the arm 52ª is the means for turning the axle. Thus is secured the adjustment of the planter without interfering in any way with its progress.

Mounted to slide on the axle 1, but designed at certain times to rotate therewith, is a sprocket-wheel 31. The hub of this sprocket-wheel is provided with a clutch member 32, designed to engage with a clutch member 33, rigidly fixed on the axle, and the clutch member 32 is held yieldingly in engagement with the member 33 by means of a spring 34, coiled around the axle and engaging at one end with the sprocket-wheel and at the other end with a collar 35, attached to the axle at the opposite side of the wheel from the clutch members. The clutch-section carried by the sprocket-wheel is moved out of engagement when necessary with the clutch-section 33 by means of toggle-links 36 37, one of which is pivoted to the clutch member 32 or to the hub of the sprocket-wheel and the other of which is pivoted to the frame 2, and at the pivotal connection between the links 36 and 37 is a foot-plate 38, upon which the driver may place his foot and by forcing down the toggle-links or toward a straight line force the clutch members out of engagement.

Extended from the sprocket-wheel 31 is a sprocket-chain 39, which engages with a sprocket-wheel 40, one-half the diameter of the sprocket-wheel 31. This sprocket-wheel 40 is mounted to rotate on a stud extended from a standard 41, mounted on the tongue 4 of the machine. Mounted to swing on the standard 41 is a tappet-rod 42, the upper horizontal portion 43 of which extends toward the wheel 40 and rearward thereof and then parallel with the wheel and is designed to be engaged with a pin 44, extended laterally from said sprocket-wheel 40. To make fine adjustments of the seed-dropping mechanism, this pin 44 is preferably extended from a block 45, adjustable circumferentially of the wheel 40 in a slot 45ª, and the wheel is provided with a series of clutch-teeth 46, designed to engage with clutch-teeth 47 on the said block 45 to hold the block rigidly as adjusted.

Extended across the front portion of the machine-frame and to the seedboxes 48 is a shaft 49, designed to operate the rotary controlling-valves in said boxes, (not shown,) and attached to this shaft 49 is a ratchet-wheel 50, the teeth of which are designed to be engaged by a link 51, mounted to swing on the horizontal portion 43 of the tappet-rod.

In the operation as the wheel 40 rotates the pin 44 by engaging with the end of the portion 43 of the tappet-arm will cause a forward swinging motion of said tappet-arm, and consequently rotate the wheel 50 and the shaft 49 one step. After the pin 44 shall have released the tappet-arm a spring 52, attached at one end to the tappet-arm and at the other end to the frame of the machine, will cause a rearward movement of the tappet-arm, permitting the link 51 to move into engagement with the next tooth of the series on the wheel 50 for a subsequent operation. Arms 52ª are extended from the shaft 1 in convenient position to be operated by the driver for adjusting the planter while in motion, also for setting it at the ends of a field.

In the construction of my machine I reduce the relative size of the ratchet-wheels and their parts coacting with the ground-wheels as compared with the ground-wheels. It is to be understood that the pawls of each ratchet-wheel do not actually engage the abutment portion of the teeth at any two points at a time, but with the abutment of one tooth at a time, so that when one pawl is pressed against a tooth of its ratchet-wheel the others will engage with the wheel at different distances from the engaging portions of the teeth. This is for the purpose of taking up or overcoming the unevenness of the ground, as the slight increased motion of the outer rims of the big wheels decreases near the center and permits the engagement of the pawls with teeth of the ratchet-wheel one after another.

In my machine the principle of the two ratchet-wheels rigidly attached to the ground-wheels is the reverse of that used in many machines—that is, instead of making the faster ground-wheel govern the seeding mechanism I provide for said governing of the seeding mechanism from the slower wheel, and thus the dropping of seeds will be regulated, especially as neither ground-wheel will permit a faster rotation of the axle than that of the movement of the ground-wheel in operative connection with it.

Having thus described my invention, I claim as new and desire to secure by Letters Patent—

1. In a planter and marker, an axle, ground-wheels loosely mounted on the axle, means for causing operative connection between the ground-wheels and the axle, marker-plates having swinging motion on the axle at the outer sides of the ground-wheels, guides for said plates, carried by the axle, and springs for yieldingly holding the plates in one direction, substantially as specified.

2. In a planter and marker, an axle, ground-wheels loosely mounted on said axle, pawl-and-ratchet mechanism for operatively connecting the ground-wheels with the axle, collars mounted on the outer ends of the axle and adapted to rotate therewith, an arm extended downward from each collar and having rearwardly-extended guide-fingers, marker-plates mounted loosely on said collars and guided between said fingers, and a spring connection between the rear sides of the marker-plates and the collars, substantially as specified.

3. In a planter, an axle, ground-wheels loosely mounted on the axle, a spring connection between one of the wheels and the axle, a crown ratchet-wheel attached to one of the ground-wheels, a pawl-carrying wheel connected to the axle, pawls carried by said pawl-carrying wheel and held yieldingly in engagement with the ratchet-wheel, means for moving said pawls out of engagement with the ratchet-wheel, and seed-dropping mechanism operated from the axle, substantially as specified.

4. In a planter, an axle, ground-wheels loosely mounted on said axle, a crown ratchet-wheel secured to one of said ground-wheels, a crown ratchet-wheel secured to the axle, a pawl-carrying wheel loosely mounted on the axle between the ratchet-wheels, pawls carried on opposite sides of said pawl-carrying wheel for engaging with the ratchet-wheels, means for moving said pawls out of engagement with the ratchet-wheels, a spring connection between the ground-wheel and the pawl-carrying wheel, and seed-dropping mechanism operated from said axle, substantially as specified.

5. In a planter, an axle, ground-wheels loosely mounted on the axle, a crown ratchet-wheel attached to one of said ground-wheels, a pawl-carrying wheel attached to the axle adjacent to said ratchet-wheel, spring-pressed pawls carried by said pawl-carrying wheel and engaging with the ratchet-wheel, and a pawl-shifting spider mounted loosely on the axle between the two wheels and having outwardly-extended arms, substantially as specified.

6. In a planter, an axle, ground-wheels loosely mounted on said axle, a spring for operatively connecting one of the ground-wheels with the axle, pawl-and-ratchet mechanism between the ground-wheels and axle for controlling the action of the spring, a sprocket-wheel mounted loosely on the axle, a clutch member on said sprocket-wheel, a clutch member attached to the axle and adapted for engagement with the first-named clutch member, a spring for holding the clutch members yieldingly together, means for moving the clutch members one out of engagement with the other, a shaft extended to seedboxes for operating valves therein, and means operated from the sprocket-wheel for causing a step-by-step motion of said shaft, substantially as specified.

7. In a planter, an axle, ground-wheels loosely mounted on said axle, a crown ratchet-wheel attached to one of the ground-wheels, a pawl-carrying wheel attached to the axle adjacent to said ratchet-wheel, spring-pressed pawls carried by the pawl-carrying wheel, the said pawls being so spaced that only one of the series will be at one time in operative engagement with the ratchet-wheels, and means for shifting the pawls away from the ratchet-wheels, substantially as specified.

8. In a planter, an axle, ground-wheels supporting the axle, a frame supported by the axle, a sprocket-wheel carried by the axle, a clutch mechanism between the axle and sprocket-wheel, means for moving the clutch members out of engagement one with the other, a shaft supported on the forward portion of the frame, seedboxes between which said shaft extends, a sprocket-wheel supported on the forward portion of the frame, a chain connection between said sprocket-wheel and the first-named sprocket-wheel, a tappet-rod mounted to swing at the forward portion of the frame, a pin carried by the sprocket-wheel for operating said tappet-rod, a ratchet-wheel on the shaft, a link mounted to swing on the tappet-rod and engaging with said ratchet-wheel, and a spring for moving the tappet-rod rearward, substantially as specified.

9. In a planter, a frame, ground-wheels mounted on an axle supporting the frame, spring mechanism for operatively connecting one of the ground-wheels with drop-actuating mechanism, and means for operatively connecting one of the ground-wheels with the drop-actuating mechanism for controlling the action of said spring, substantially as specified.

10. In a planter, an axle, ground-wheels loosely mounted on the axle, a spring for operatively connecting one of the ground-wheels with drop-actuating mechanism, a pawl-and-ratchet mechanism operatively connecting the ground-wheel with drop-actuating apparatus for controlling the action of the spring, and means for breaking the said connection, substantially as specified.

11. In a planter, a frame, ground-wheels mounted on an axle supporting the frame, a spring for operatively connecting one of the ground-wheels with the axle, a pawl-and-ratchet mechanism operatively connecting one of the ground-wheels and axle for controlling the action of the spring, a pawl-and-ratchet mechanism operatively connecting the other ground-wheel with the drop-actuating mechanism, and means for breaking the said connection, substantially as specified.

12. In a planter, an axle, ground-wheels loosely mounted on the axle, a spring operatively connecting one of the ground-wheels with the axle, pawl-and-ratchet mechanism operatively connecting one of said ground-wheels with the axle for controlling the action of the spring, a pawl-and-ratchet mechanism operatively connecting the other ground-wheel with the axle, and means for breaking said connections, substantially as specified.

13. In a planter, an axle, ground-wheels supporting the axle, a frame supported by the axle, a wheel arranged at the forward portion of the frame, an operating connection between said wheel and the axle, a pin adjustable circumferentially on said wheel, a tappet-arm mounted to swing and adapted to be engaged by said pin, a shaft supported on said frame and extended between seedboxes, a ratchet-wheel carried by the shaft, a link mounted to swing on the tappet-rod and engaging with said ratchet-wheel, and a spring for moving the tappet-rod rearward, substantially as specified.

14. In a planter, an axle, ground-wheels supporting said axle, a frame supported by the axle, a sprocket-wheel loosely mounted on the axle, a clutch member on said sprocket-wheel, a clutch member attached to the axle, a spring for holding the clutch members in yielding connection, toggle-links having pivotal connection with the clutch member of the sprocket-wheel and pivotal connection with the frame, a foot-plate mounted on the toggle-links at the connecting-point, and seed-dropping mechanism operated from said sprocket-wheel, substantially as specified.

In testimony whereof I have signed my name to this specification in the presence of two subscribing witnesses.

HARRY LEE JOHNSON.

Witnesses:
R. B. PRICE,
D. E. BELL.